United States Patent
Rosplock (10) Patent No.: US 12,117,025 B2
(45) Date of Patent: Oct. 15, 2024

(54) SEAL GROOVE COOLING FLOW

(71) Applicant: James D. Rosplock, Roscoe, IL (US)

(72) Inventor: James D. Rosplock, Roscoe, IL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/698,391

(22) Filed: Mar. 18, 2022

(65) Prior Publication Data
US 2023/0296117 A1 Sep. 21, 2023

(51) Int. Cl.
| | |
|---|---|
| *F15B 15/14* | (2006.01) |
| *F15B 21/0423* | (2019.01) |
| *F16J 1/00* | (2006.01) |
| *F16J 10/02* | (2006.01) |
| *F16J 15/16* | (2006.01) |
| *F15B 15/28* | (2006.01) |

(52) U.S. Cl.
CPC ...... *F15B 15/1485* (2013.01); *F15B 15/1442* (2013.01); *F15B 15/1461* (2013.01); *F15B 15/1466* (2013.01); *F16J 1/008* (2013.01); *F16J 10/02* (2013.01); *F16J 15/162* (2013.01); *F15B 15/1452* (2013.01); *F15B 15/149* (2013.01); *F15B 15/2815* (2013.01); *F15B 21/0423* (2019.01)

(58) Field of Classification Search
CPC .. F15B 15/1485; F15B 15/1452; F15B 15/14; F15B 15/149; F15B 15/2815; F15B 15/0423; F16J 15/162; F16J 10/02
See application file for complete search history.

(56) References Cited

U.S. PATENT DOCUMENTS

| | | | |
|---|---|---|---|
| 2,955,574 A | | 10/1960 | Geyer |
| 3,160,836 A | * | 12/1964 | Farley .............. F15B 15/283 92/84 |
| 3,403,365 A | * | 9/1968 | Richards ............ F15B 15/2823 336/87 |
| 3,874,676 A | * | 4/1975 | Taylor .................... F01D 25/12 277/927 |

(Continued)

FOREIGN PATENT DOCUMENTS

| | | | | |
|---|---|---|---|---|
| CN | 112483503 | * | 3/2021 | .......... F15B 15/1485 |
| EP | 1942281 A1 | | 7/2008 | |

(Continued)

*Primary Examiner* — Dustin T Nguyen
(74) *Attorney, Agent, or Firm* — Reinhart Boerner Van Deuren P.C.

(57) ABSTRACT

Disclosed are seal arrangements in a hydraulic device. The seal arrangement includes a seal channel defining a loop. A seal is seated within the seal channel. A coolant flow passage has a first part intersecting with the seal channel at a first point and a second part intersecting with the seal channel at a second point. The first part of the coolant flow passage is configured to provide hydraulic fluid to the seal channel such that, at the first point, a first portion of the hydraulic fluid flows in a first direction around the loop and a second portion of the hydraulic fluid flows in a second direction opposite to the first direction around the loop. At the second point, the first portion of hydraulic fluid and the second portion of hydraulic fluid are configured to flow into the second part of the coolant flow passage.

18 Claims, 5 Drawing Sheets

(56) References Cited

U.S. PATENT DOCUMENTS

| | | | | | |
|---|---|---|---|---|---|
| 4,552,055 | A | * | 11/1985 | Foxwell | F15B 15/2823 |
| | | | | | 91/1 |
| 4,879,440 | A | * | 11/1989 | Lymburner | H01H 3/16 |
| | | | | | 200/82 R |
| 5,331,884 | A | * | 7/1994 | Ando | B22D 17/2038 |
| | | | | | 92/111 |
| 5,865,441 | A | * | 2/1999 | Orlowski | F16J 15/3444 |
| | | | | | 277/374 |
| 7,276,898 | B2 | * | 10/2007 | Rosplock | G01D 5/145 |
| | | | | | 324/207.2 |
| 8,540,478 | B2 | * | 9/2013 | Teragaki | F16J 15/3404 |
| | | | | | 415/230 |

FOREIGN PATENT DOCUMENTS

| | | | | |
|---|---|---|---|---|
| EP | 2955385 | A1 | 12/2015 | |
| EP | 3772595 | A1 | 2/2021 | |
| FR | 3042555 | * | 4/2017 | F15B 15/14 |
| GB | 2476174 | A | 6/2011 | |
| SE | 1851044 | A1 | 3/2019 | |

\* cited by examiner

SEAL GROOVE COOLING FLOW

FIELD OF THE INVENTION

This invention generally relates to hydraulic actuators and, in particular, to a seal arrangement that provides cooling flow for seals.

BACKGROUND OF THE INVENTION

Aircraft engine components that carry flammable fluids typically have a requirement to survive a 2000° F. fire test without leaking fluid. A component may be required to withstand such temperatures without leaking for up to 15 minutes depending on the location of the component on the engine. These components employ elastomer and PTFE seals to prevent external leakage. During a fire test, the structural components may reach temperatures in excess of 1000° F., and the seals will leak prior to reaching 1000° F. Previous attempts to keep seal temperatures below the leaking threshold involve utilizing the internal fluid flow within the component to cool the structural components that house the seals. In some cases, the cooling flow path is not in close enough proximity to seals such that cooling of the structural components provides sufficient cooling of the seals to prevent leakage during a fire test, which may require increased cooling flow to provide sufficient cooling. However, it is desirable to minimize cooling flow because increased cooling flow decreases the overall efficiency of the engine component. In other cases, the cooling flow path can be rerouted within the structural components such that the cooling flow path is closer to the seals, keeping the seal temperature lower, but such rerouting is not always practical. In still other cases, shields or thermal blankets are employed to help keep the seals cooler, but these options add weight, envelope, and cost.

Accordingly, Applicant has recognized a need in the art for a seal arrangement in which cooling flow provides sufficient cooling of the seals so that requisite engine fire tests can be passed.

BRIEF SUMMARY OF THE INVENTION

Embodiments of the present disclosure address the foregoing issues in the art by providing a cooling flow path that directly cools the seals in an engine component. In particular, embodiments of the present disclosure relate to a seal arrangement in which cooling flow is routed through the seal grooves that contain the seals, which has been found to significantly reduce the maximum temperature of the seals during a fire test. These and other advantages of the invention, as well as additional inventive features, will be apparent from the description of the invention provided herein.

In a first aspect, embodiments of the disclosure relate to a seal arrangement in a hydraulic device. The hydraulic device includes a first seal channel defining a first loop and having a first width. A first seal is seated within the first seal channel and has a second width that is less than the first width. A first coolant flow passage has a first part intersecting with the first seal channel at a first point and a second part intersecting with the first seal channel at a second point. The first part of the first coolant flow passage is configured to provide hydraulic fluid to the first seal channel such that, at the first point, a first portion of the hydraulic fluid flows in a first direction around the first loop and a second portion of the hydraulic fluid flows in a second direction around the first loop, the second direction being opposite to the first direction. At the second point, the first portion of hydraulic fluid and the second portion of hydraulic fluid are configured to flow into the second part of the first coolant flow passage.

In embodiments according to the first aspect, the first seal channel has a first region with a first depth and a step with a second depth that is less than the first depth. In one or more such embodiments, the first seal is located in the first region, and the step is positioned to cover from about 20% to about 100% of an opening of the first part of the first coolant flow passage.

In embodiments according to the first aspect, the first loop is circular, and the first part and the second part are diametrically opposed around the first loop.

In embodiments according to the first aspect, the second part of the first coolant flow passage is in fluid communication with a cooling flow line configured to transport the hydraulic fluid to a second coolant flow passage. In one or more such embodiments, the second coolant flow passage intersects with an outer seal channel at a third point. The outer seal channel defines a second loop and has an outer seal seated therein. In one or more such embodiments, a third portion of the hydraulic fluid flows in a third direction around the second loop, and a fourth portion of the hydraulic fluid flows in a fourth direction around the second loop. The fourth direction is opposite to the third direction. Further, in one or more such embodiments, at a fourth point, the third portion of hydraulic fluid and the fourth portion of hydraulic fluid are configured to flow into a third coolant flow passage extending inwardly to an inner seal channel in which an inner seal is seated.

Further, in one or more such embodiments, the outer seal channel has a first region with a first depth and a step with a second depth that is less than the first depth. The outer seal is located in the first region, and the step is positioned to cover from about 20% to about 100% of an opening of the second coolant flow passage.

Still further, in one or more such embodiments, the inner seal channel defines a third loop. A fifth portion of the hydraulic fluid flows in a fifth direction around the third loop, and a sixth portion of the hydraulic fluid flows in a sixth direction around the third loop. The sixth direction is opposite to the fifth direction. At a fifth point, the fifth portion of hydraulic fluid and the sixth portion of hydraulic fluid are configured to flow into an outlet passage arranged perpendicular to the third coolant flow passage.

In one or more such embodiments, the inner seal channel has a first region with a first depth and a step with a second depth less than the first depth, and the inner seal fills a width of the first region.

In a second aspect, the embodiments of the present disclosure provide a linear actuator. The linear actuator includes a housing having an interior cavity with a first end and a second end. The linear actuator also includes a piston head disposed within the interior cavity and movable from the first end toward the second end and back within the interior cavity. The piston head has a first surface and a second surface. A piston cover is disposed at the second end of the interior cavity. The piston cover has a third surface, a fourth surface, an outer peripheral surface, and a first aperture extending from the third surface to the fourth surface. The first aperture has an interior aperture surface. The linear actuator also includes a piston actuator having a piston shaft and a position sensor disposed within the piston shaft. The piston shaft is operatively connected to the piston head and extends through the first aperture of the piston cover. The position sensor includes a head disposed within a second aperture of the housing. Further, the linear actuator includes a first port through which hydraulic fluid is configured to flow into the interior cavity on the first surface of the piston head and a second port through which hydraulic fluid is configured to flow into the interior cavity on the second surface of the piston head. Additionally, the linear actuator includes at least one seal arrangement with at least one seal channel and at least one seal seated in the at least one seal channel. Hydraulic fluid flowing between the first port and the second port is provided to the at least one seal channel to cool the at least one seal. Further, the at least one seal arrangement is provided between at least one of the housing and the outer peripheral surface of the piston cover, the interior aperture surface and the piston shaft, or the head of the position sensor and the second aperture.

In one or more embodiments according to the second aspect, the at least one seal arrangement includes a first seal arrangement between the head of the position sensor and the second aperture. The first seal arrangement has a first seal channel forming a first loop around the head of the position sensor and a first seal seated within the first seal channel. The linear actuator further includes a first coolant flow passage having a first part in fluid communication with the first port and intersecting with the first seal channel at a first point and a second part intersecting with the first seal channel at a second point. The first part of the first coolant flow passage is configured to provide hydraulic fluid to the first seal channel such that, at the first point, a first portion of the hydraulic fluid flows in a first direction around the first loop and a second portion of the hydraulic fluid flows in a second direction around the first loop. The second direction is opposite to the first direction. At the second point, the first portion of hydraulic fluid and the second portion of hydraulic fluid are configured to flow into the second part of the first coolant flow passage.

In one or more such embodiments, the first seal channel has a first region with a first depth and a step with a second depth that is less than the first depth. The first seal is located in the first region, and the step is positioned to cover from about 20% to about 100% of an opening of the first part of the first coolant flow passage.

In one or more such embodiments, the first loop is circular, and the first part and the second part are diametrically opposed around the first loop.

In one or more such embodiment, the at least one seal arrangement further includes a second seal arrangement between the housing and the outer peripheral surface of the piston cover. The second part of the first coolant flow passage is in fluid communication with a cooling flow line configured to transport the hydraulic fluid to the second seal arrangement. The second seal arrangement includes a second coolant flow passage, an outer seal channel formed in the outer peripheral surface of the piston cover, and an outer seal seated within the outer seal channel. The second coolant flow passage intersects with the outer seal channel at a third point, and the outer seal channel defines a second loop. A third portion of the hydraulic fluid flows in a third direction around the second loop, and a fourth portion of the hydraulic fluid flows in a fourth direction around the second loop. The fourth direction is opposite to the third direction.

In one or more such embodiments, the outer seal channel has a second region with a third depth and a second step with a fourth depth that is less than the third depth. The outer seal is located in the second region, and the second step is positioned to cover from about 20% to about 100% of an opening of the second coolant flow passage.

In one or more such embodiments, the at least one seal arrangement further includes a third seal arrangement between the interior aperture surface and the piston shaft. At a fourth point, the third portion of hydraulic fluid and the fourth portion of hydraulic fluid are configured to flow to the third seal arrangement. The third seal arrangement includes a third coolant flow passage, an inner seal channel defined in the interior aperture surface, which forms a third loop around the piston shaft, and an inner seal seated within the inner seal channel. The third coolant flow passage extends inwardly to an inner seal channel.

In one or more such embodiments, a fifth portion of the hydraulic fluid flows in a fifth direction around the third loop, and a sixth portion of the hydraulic fluid flows in a sixth direction around the third loop. The sixth direction is opposite to the fifth direction. At a fifth point, the fifth portion of hydraulic fluid and the sixth portion of hydraulic fluid are configured to flow into an outlet passage arranged perpendicular to the third coolant flow passage. The outlet passage is in fluid communication with the second port.

In such an embodiment, the inner seal channel may have a third region with a fifth depth and a third step with a sixth depth less than the fifth depth, and the inner seal may fill a width of the third region.

In one or more embodiments according to the second aspect, the hydraulic fluid is fuel. Further, in one or more embodiments, the at least one seal of the at least one seal arrangement is kept below the temperature at which the at least one seal leaks (e.g., below 1000° F.) for at least 5 minutes when tested according to SAE AS4273 or RTCA DO-160—Section 26.0. Still further, in one or more embodiments, the at least one seal of the at least one seal arrangement is kept below the temperature at which the at least one seal leaks (e.g., below 1000° F.) for at least 15 minutes when tested according to SAE AS4273 or RTCA DO-160—Section 26.0. In such embodiments, the at least one seal may be made of an elastomer or PTFE.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of the present disclosure relate to a seal arrangement that provides cooling flow for seals to prevent overheating. Certain applications, such as aircraft engines, include hydraulic actuators controlled using engine oil or fuel (such as jet fuel or aviation gas) that powers the engine. Such actuators must be able to withstand fires that breakout in the aircraft for a certain period of time without leaking fuel that would sustain the fire or cause it to spread. According to embodiments of the present disclosure, seals within the hydraulic actuators are cooled by directing hydraulic fluid (such as fuel or engine oil) into the channels in which the seals are seated. In this way, the seals are directly cooled, which significantly reduces the maximum temperature of the seal during testing according to relevant fire performance standards. The present discussion is framed in terms of a linear hydraulic actuator, but the concept of routing cooling flow through a seal channel to cool the seal seated therein is applicable to other apparatuses that contain flammable fluids, such as a hydromechanical unit (HMU). These and other aspects and advantages will be discussed in greater detail in relation to the embodiments described below and depicted in the figures. The embodiments provided herein are provided by way of illustration and not by way of limitation.

Figure 1:
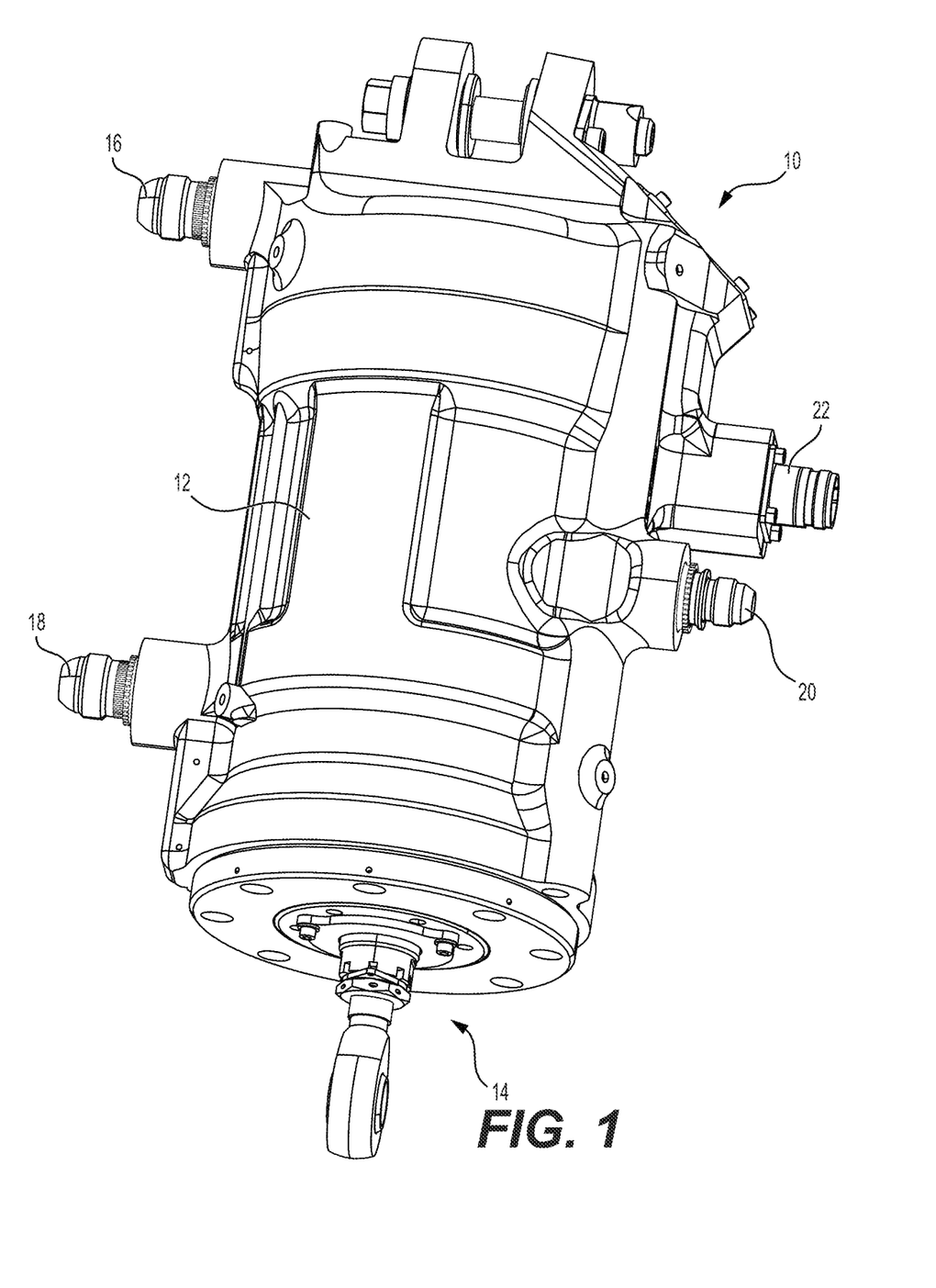
FIG. 1 is a perspective view of a linear hydraulic actuator including a seal arrangement with cooling flow, according to an example embodiment.

FIG. 1 depicts an embodiment of a linear actuator 10. The linear actuator 10 includes a housing 12 and an actuator piston 14. The linear actuator 10 is hydraulically actuated to move the actuator piston 14 out of or retract the actuator piston 14 into the housing 12. In one or more embodiments, the hydraulic fluid used to actuate the piston 14 is engine oil or fuel used to power the aircraft that includes the linear actuator 10. The hydraulic fluid enters the housing 12 through a first port 16 and exits the housing 12 through a second port 18 to move the actuator piston 14 out of the housing 12. The hydraulic fluid enters the housing 12 through the second port 18 and exits the housing 12 through the first port 16 to retract the actuator piston 14 into the housing 12. The linear actuator 10 also includes a drain port 20, which is described more fully below, and an electrical connector 22. The electrical connector 22 allows for electrical communication with various sensors that may determine the position of the actuator piston 14.

Figure 2:
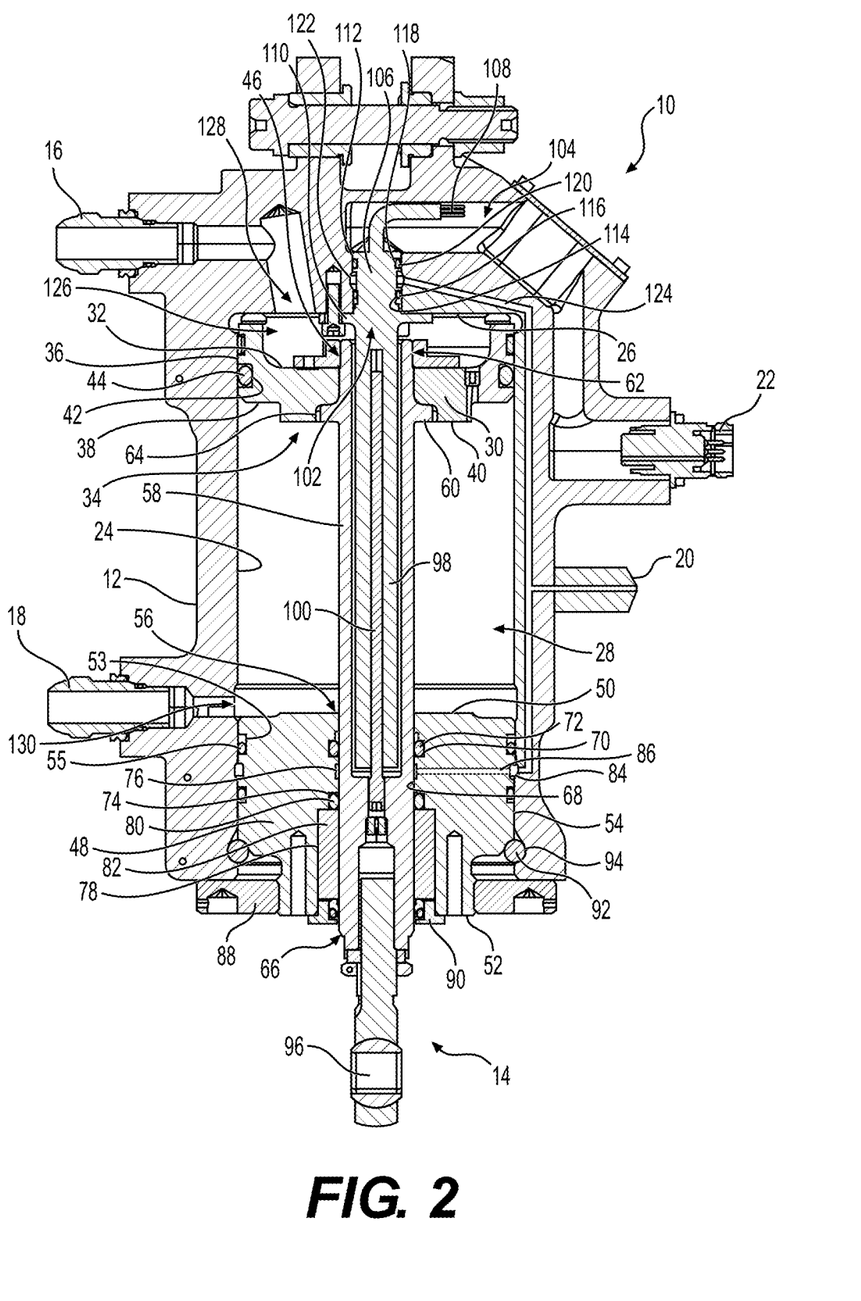
FIG. 2 is a vertical cross-sectional view of the linear hydraulic actuator of FIG. 1, according to an example embodiment.

FIG. 2 depicts a cross-sectional view of the linear actuator 10. As can be seen in FIG. 2, the housing 12 includes a first interior wall 24 and a second interior wall 26 that define an interior cavity 28. In the embodiment shown in FIG. 2, the first interior wall 24 establishes a periphery of the interior cavity 28, and the second interior wall 26 is perpendicular to the first interior wall 24 so as to enclose one end of the interior cavity 28. Disposed within the interior cavity 28 is a piston head 30.

The piston head 30 has a first surface 32, a second surface 34, and a first peripheral surface 36 disposed between the first surface 32 and the second surface 34. In one or more embodiments, the first surface 32 is a concave surface facing the second interior wall 26. Further, in one or more embodiments, the second surface 34 includes a first tier 38 and a second tier 40. Still further, in one or more embodiments, the first peripheral surface 36 includes one or more peripheral channels 42 into which seals 44 are seated. The first peripheral surface 36 is configured to engage the first interior wall 24, in particular so that the seals 44 prevent hydraulic fluid from flowing between the first interior wall 24 and the first peripheral surface 36. The piston head 30 includes a first aperture 46 extending between the first surface 32 and the second surface 34.

Disposed at the opposite end of the interior cavity 28 from the second interior wall 26 is a piston cover 48. The piston cover 48 includes a third surface 50, a fourth surface 52, and a second peripheral surface 54 disposed between the third surface 50 and the fourth surface 52. In one or more embodiments, the third surface 50 is tiered; although the tiering of the third surface 50 may be to a lesser extent than embodiments of the linear actuator 10 in which the second surface 34 is tiered.

A cooled seal arrangement is formed between the second peripheral surface 54 and the piston cover 48. In one or more embodiments, including the embodiment shown in FIG. 2, the second peripheral surface 54 includes at least one cooling flow channel 53 in which a cooled seal 55 is seated. However, in one or more other embodiments, the at least one cooling flow channel 53 is formed in the first interior wall 24 of the housing 12 such that the cooled seal 55 seated therein engages the second peripheral surface 54. Further, in one or more embodiments, the second peripheral surface 54 or first interior wall 24 of the housing 12 may include one or more other seal channels into which uncooled seals are seated. The seals, including cooled seal 55, create an engagement between the second peripheral surface 54 and the first interior wall 24, in particular to prevent hydraulic fluid from flowing between the first interior wall 24 and the second peripheral surface 54.

The piston cover 48 includes a second aperture 56 extending between the third surface 50 and the fourth surface 52. A piston shaft 58 extends through the first aperture 46 of the piston head 30 and through the second aperture 56 of the piston cover 48. In one or more embodiments, the piston shaft 58 includes a first flange 60 extending from the outer surface of the piston shaft 58 proximal to a first end 62 of the piston shaft 58. In such embodiments, the first flange 60 engages a countersunk region 64 disposed around the first aperture 46. In this way, movement of the piston head 30 towards the piston cover 48 drives movement of the piston shaft 58.

A second end 66 of the piston shaft 58 extends through the second aperture 56. The second aperture 56 has a first interior aperture surface 68. Another cooled seal arrangement is formed between the first interior aperture surface 68 and the piston shaft 58. In particular, the first interior aperture surface 68 includes at least a first seal channel 70 within which a first seal 72 is seated. As will be discussed below, the first seal channel 70 is configured to carry cooling flow to cool the first seal 72. In the embodiment shown in FIG. 2, the first interior aperture surface 68 also includes a second seal channel 74, an inner drain channel 76 disposed between the first seal channel 70 and the second seal channel 74, and a bearing channel 78. A second seal 80 is seated in the second seal channel 74, and a bearing 82 to facilitate sliding of the piston shaft 58 is seated in the bearing channel 78. The inner drain channel 76 is positioned between the first seal channel 70 and the second seal channel 74 to collect any hydraulic fluid that may be pulled through the first seal 72 by movement of the piston shaft 58.

As can be seen in FIG. 2, the piston cover 48 also includes an outer drain channel 84 connected to the inner drain channel 76 by a first drain passage 86. Hydraulic fluid that flows from the inner drain channel 76 through the drain passage 86 and to the outer drain channel 84 is removed from the linear actuator 10 through the drain port 20.

The piston cover 48 and related components are held in place by a piston cover cap 88 and a second aperture cap 90. As can be seen in FIG. 2, the fourth surface 52 of the piston cover 48 defines a smaller surface area than the third surface 50. Once positioned within the housing 12, the piston cover 48 is held in place with a metal ring 92 that is seated between the piston cover 48 and a channel 94 formed in the first interior wall 24. The piston cover cap 88 is then fastened to the piston cover 48. Similarly, the second aperture cap 90 is fastened over the second aperture 56 of the piston cover 48 to hold the bearing 82 and second seal 80 in place within the second aperture 56 of the piston cover 48. The second end 66 of the piston shaft 58 extends through the second aperture 56 and the second aperture cap 90 to an exterior of the linear actuator 10. In one or more embodiments, a connector 96 may be attached to the second end 66 of the piston shaft 58 in order to connect the piston shaft 58 to an apparatus to be controlled by the linear actuator 10. When provided, the connector 96 together with the piston shaft 58 define the piston actuator 14.

Disposed within the piston shaft 58 are a stator element 98 and a sliding core 100 that together create a position sensor. The sliding core 100 is connected to the piston shaft 58 such that movement of the piston shaft 58 causes movement of the sliding core 100 within the stator element 98, which remains stationary relative to the sliding core 100. As can be seen in FIG. 2, the second interior wall 26 includes a third aperture 102 that leads into an electrical chamber 104. A head 106 of the stator element 98 extends through the third aperture 102 into the electrical chamber 104. Electrical leads 108 extend from the head 106 of the stator element 98, which can be routed to the electrical connector 22 for external connection to a control system. In this way, the sliding core 100 and the stator element 98 provide a position sensor in which sliding of the core 100 (caused by movement of the piston shaft 58) within the stator element 98 allows for a determination of the position of the actuator piston 14. The stator element 98 includes a flange 110 that is fastened to the second interior wall 26 of the housing 12 to hold the stator element 98 in place during operation.

A further cooled seal arrangement is formed between the head 106 of the stator element 98 and the third aperture 102. In particular, the head 106 of the stator element includes an exterior surface 112 having at least one third seal channel 114 into which a third seal 116 is seated. The third seal channel 114 is configured to carry cooling flow to cool the third seal 116. In one or more embodiments, including the embodiment depicted in FIG. 2, the exterior surface 112 also includes a fourth seal channel 118 into which a fourth seal 120 is seated and a drain channel 122 disposed between the third seal channel 114 and the fourth seal channel 118. The drain channel 122 is connected to a second drain passage 124, which is in fluid communication with the drain port 20.

Similar to the inner drain channel of the 76 of the second aperture 56, the drain channel 122 of the third aperture 102 allows for removal of hydraulic fluid that bypasses the third seal 116.

In operation, the linear actuator 10 moves the piston actuator 14 by moving the piston head 30. FIG. 2 depicts the piston actuator 14 in the retracted configuration in which the piston head 30 is proximal to the second interior wall 26. The concave first surface 32 of the piston head 30 and the second interior wall 26 form a first fluid chamber 126. The first fluid chamber 126 is in fluid communication with the first port 16 via a first passage 128 through the second interior wall 26. When hydraulic fluid is pumped through the first port 16 and the first passage 128 into the first fluid chamber 126, the fluid pressure builds in the first fluid chamber 126, and when the fluid pressure is high enough, the piston head 30 is forced to move toward the piston cover 48, which causes the piston actuator 14 to move to the extended position. Fluid in the interior cavity 28 between the piston head 30 and the piston cover 48 is forced out of the second port 18. In particular, the first interior wall 24 includes a second passage 130 through which fluid in the interior cavity 28 flows to the second port 18. When the second surface 34 of the piston head 30 abuts the piston cover 48, the piston actuator 14 is in the fully extended position.

As mentioned above, the second surface 34 may be tiered, and in such embodiments, the second tier 40 contacts the third surface 50 of the piston cover 48. A second fluid chamber is thus created between the first tier 38 and the third surface 50 so that hydraulic fluid from the second port 16 can flow back into the interior cavity 28 through the second passage 130. When the fluid pressure in the second fluid chamber is high enough, the piston head 30 is forced back toward the second interior wall 26, retracting the piston actuator 14. During retraction, hydraulic fluid in the first fluid chamber 126 is forced back out of the first port 16 through the first passage 128.

Aircraft incorporating such linear actuators 10 as described in relation to FIGS. 1 and 2 need to pass relevant safety criteria. In particular, the linear actuator 10 may be required to meet certain fire performance standards, such as SAE AS4273—"Fire Testing of Fluid Handling Components for Aircraft Engines and Aircraft Engine Installations" and RTCA DO-160—Section 26.0—Fire and Flammability. Such tests may require the seals within the linear actuator 10 to prevent external leakage at temperatures of up to 2000° F. for a time of five minutes or fifteen minutes depending on the location of the linear actuator 10 on the engine). However, the seals (e.g., made of elastomer or PTFE material) will leak at temperatures below 1000° F. (particularly at temperatures of 650° F. or below), and thus, according to the present disclosure, certain seals are directly cooled to prevent the seals from reaching the temperature at which leakage occurs.

Figure 3:
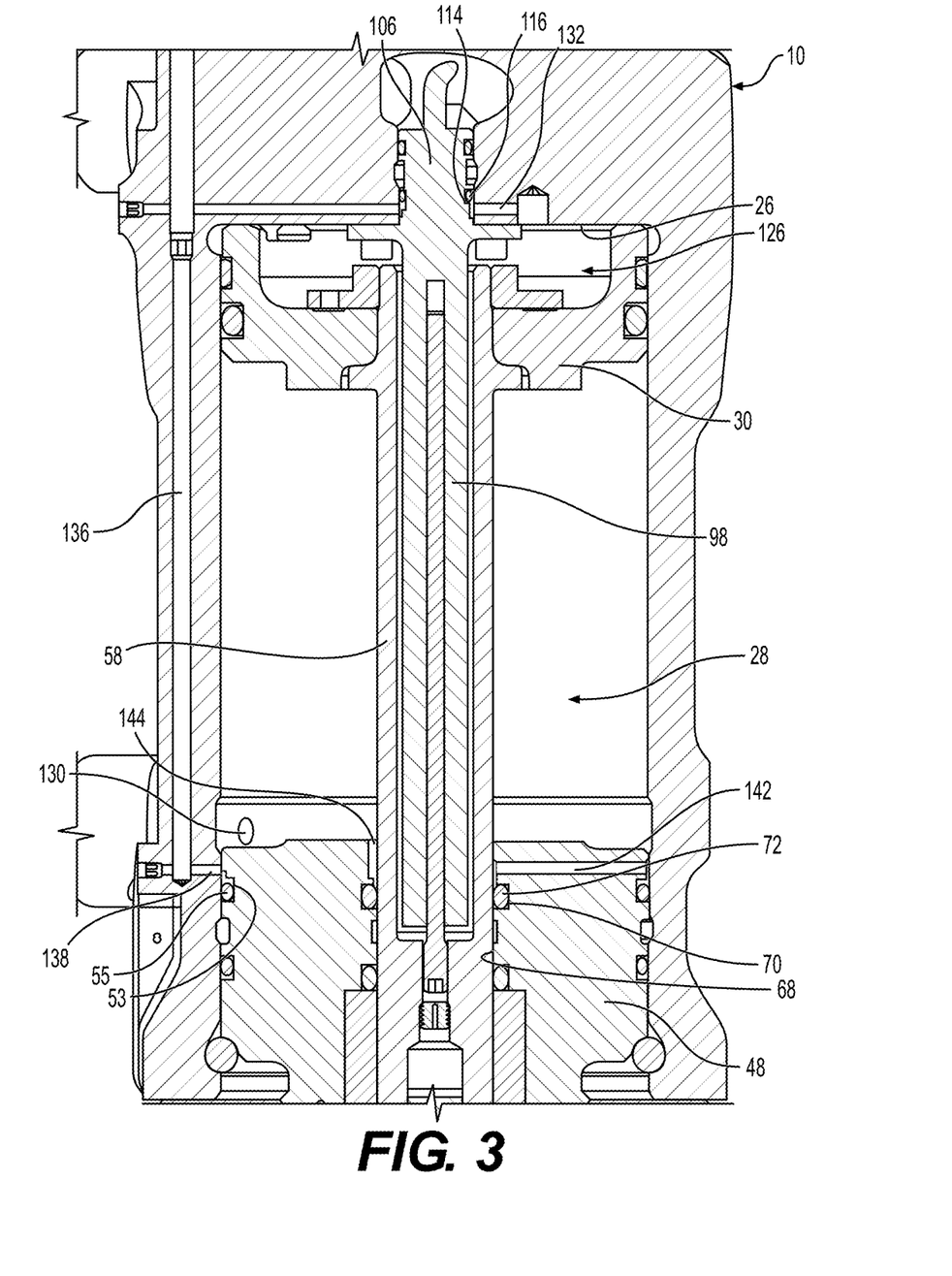
FIG. 3 is another vertical cross-sectional view of the linear hydraulic actuator of FIG. 1, according to an example embodiment.
Figure 4:
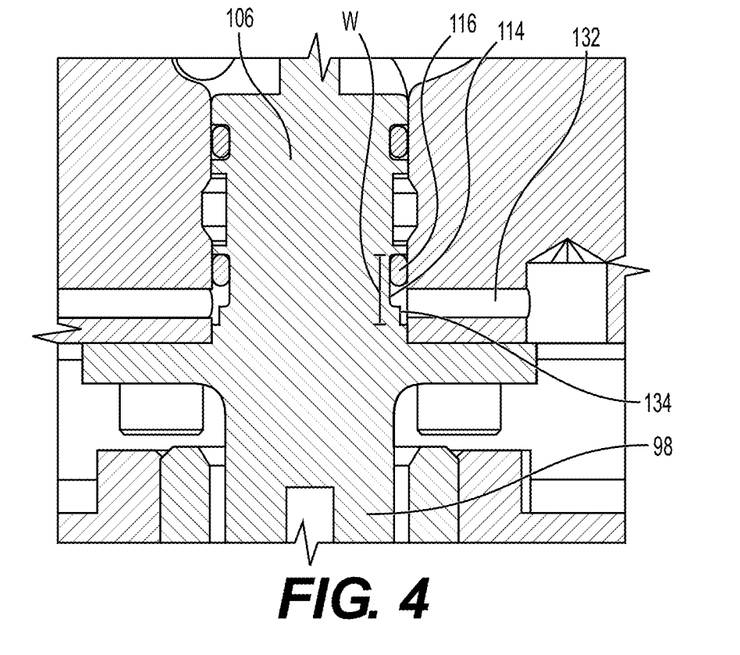
FIG. 4 is a close-up cross-sectional view of a first cooling flow seal arrangement at a first end of the linear hydraulic actuator depicted in FIG. 3, according to an example embodiment.

FIG. 3 depicts another cross-sectional view of the linear actuator 10. The cross-sectional view is taken longitudinally across a plane rotated around the longitudinal axis (concentric with the piston shaft 58) from the cross-sectional plane shown in FIG. 2. In this cross section, a coolant flow path using the hydraulic fluid is depicted. The coolant flow path begins with hydraulic fluid in the first fluid chamber 126, which flows into a first coolant flow passage 132 formed through the second interior wall 26. The first coolant flow passage 132 intersects with the head 106 of the stator element 98. In particular, in a first cooled seal arrangement, the third seal channel 114 is formed in such a way that the third seal 116 does not occupy the entire third seal channel 114. Instead, as shown in FIG. 4, the third seal channel 114 has a width W that is wider than the third seal 116. In this way, hydraulic fluid is constantly flowing over the third seal 116 to cool the third seal 116. In one or more embodiments, the third seal channel 114 also includes a first step 134. The first step 134 has a shallower depth than the rest of the third seal channel 114. Further, in one or more embodiments, the first step 134 extends within the third seal channel 114 across about 20% to about 100% (in particular about 40% to about 60% and particularly about half) of the opening of the first coolant flow passage 132 into the third seal channel 114. In this way, movement of the third seal 116 within the third seal channel 114 is prevented from completely obstructing the flow of hydraulic fluid into the third seal channel 114 because the third seal 116 will abut the first step 134. Notwithstanding, in one or more other embodiments, the first coolant flow passage 132 could open directly into a wide third seal channel 114 on one side of the third seal 116. In such an embodiment, there would be no first step 134.

Figure 5:
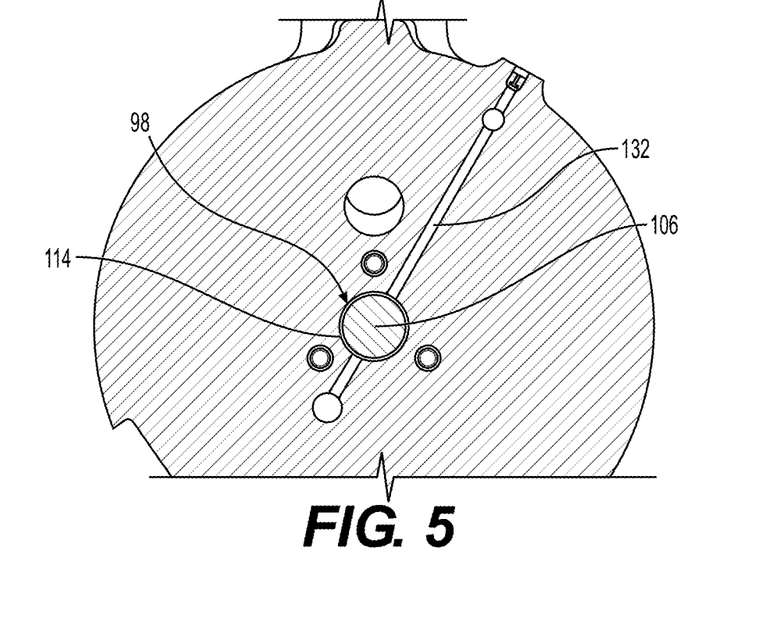
FIG. 5 is a horizontal cross-sectional view of the linear hydraulic actuator of FIG. 1 taken across the first cooling flow seal arrangement, according to an example embodiment.

As shown in FIG. 5, a first part of the first coolant flow passage 132 intersects with the head 106 of the stator element 98 such that the flow of hydraulic fluid is divided around the head 106. That is, half of the flow from the first part of the first coolant flow passage 132 will flow clockwise through the third seal channel 114, and the other half will flow counterclockwise through the third seal channel 114. In the embodiment shown in FIG. 5, the hydraulic fluid flowing into the third seal channel 114 meets at a diametrically opposed point on the opposite side of the head 106 to continue flowing through a second part of the first coolant flow passage 132. In one or more other embodiments, the flow of hydraulic fluid may meet at a location that is not diametrically opposed to the entry point. However, the diametric flow path for the first coolant flow passage 132 is easier to produce from a machining perspective by drilling the passage directly through the interior surface of the third aperture 102. Notwithstanding, two separate holes intersecting with the third aperture 102 or a single hole that does not intersect with the center of the third aperture 102 could be machined into the housing 12 to provide a first coolant flow passage 132 that intersects with the third aperture 102 in a non-diametric manner.

Figure 6:
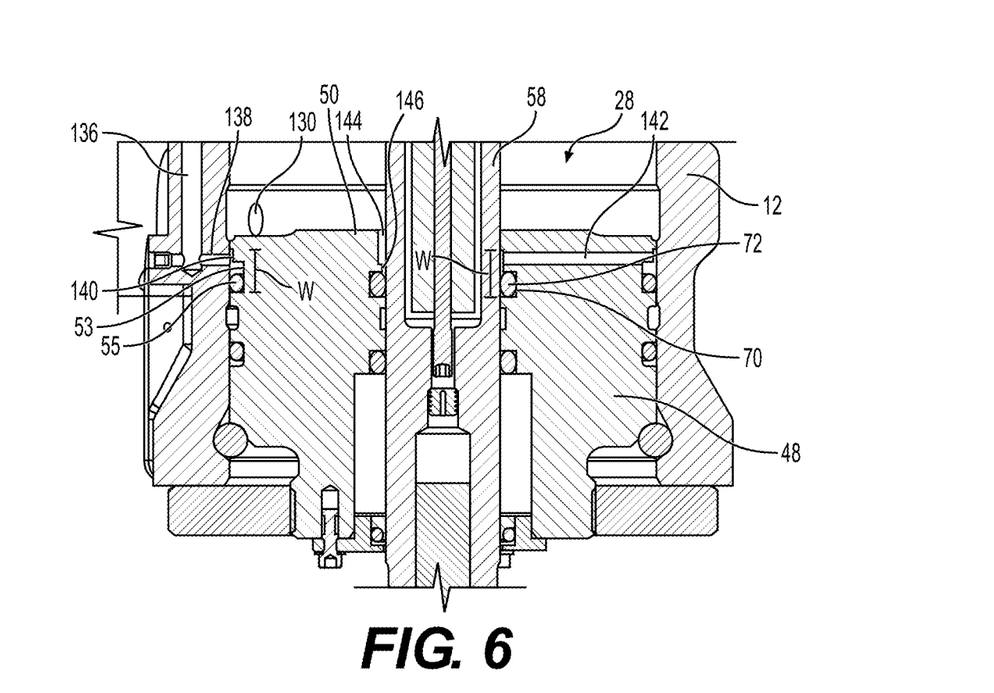
FIG. 6 is a close-up cross sectional view of a second cooling flow seal arrangement and a third cooling flow seal arrangement at a second end of the linear hydraulic actuator depicted in FIG. 3, according to an example embodiment.

Returning to FIG. 3, it can be seen that the first coolant flow passage 132 intersects with a cooling flow line 136 that transports the hydraulic fluid to the piston cover 48. There, a second coolant flow passage 138 receives hydraulic fluid from the cooling flow line 136. The second coolant flow passage 138 intersects with the cooling flow channel 53 of a second cooled seal arrangement. In the embodiment depicted, the second cooling flow channel 53 is formed in the second peripheral surface 54 of the piston cover 48, but as mentioned above, the second cooling flow channel 53 could instead be formed in the first interior wall 24 of the housing 12. As shown in FIG. 6, the cooling flow channel 53 has a width W that is wider than the cooled seal 55. In this way, hydraulic fluid is constantly flowing by the cooled seal 55 to cool the cooled seal 55. In one or more embodiments, the cooling flow channel 53 also includes a second step 140. The second step 140 has a shallower depth than the rest of the cooling flow channel 53. Further, the second step 140 extends within the cooling flow channel 53 across about 20% to about 100% (in particular about 40% to about 60% and particularly about half) of the opening of the second coolant flow passage 138 into the cooling flow channel 53. In this way, movement of the cooled seal 55 within the cooling flow channel 53 is prevented from completely obstructing the flow of hydraulic fluid into the cooling flow channel 53 because the cooled seal 55 will abut the second step 140. Notwithstanding, in one or more other embodiments, the second coolant flow passage 138 could open directly into a wide cooling flow channel 53 on one side of the cooled seal 55. In such an embodiment, there would be no second step 140.

Figure 7:
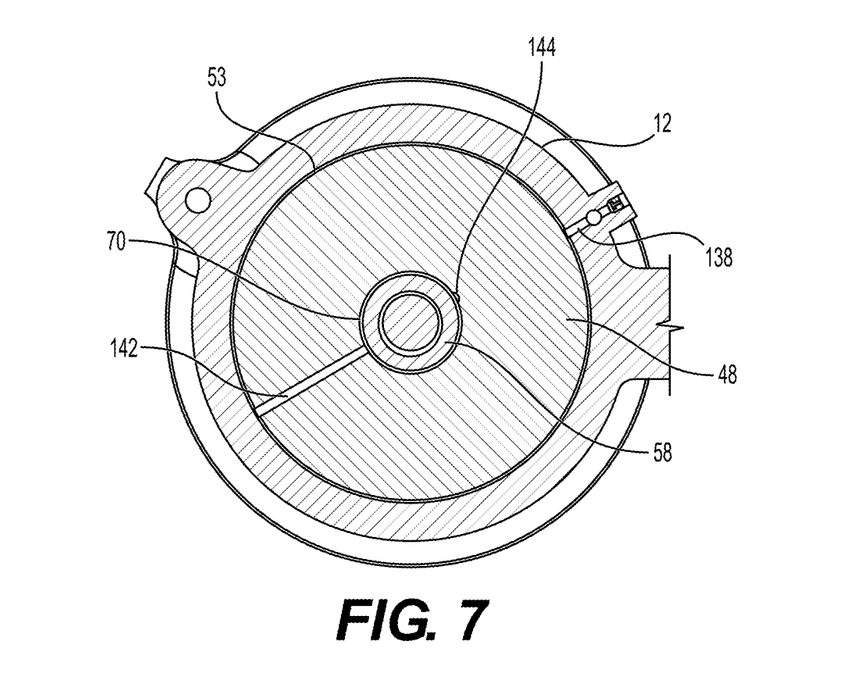
FIG. 7 is another horizontal cross-sectional view of the linear hydraulic actuator of FIG. 1 taken across the second and third cooling flow seal arrangements, according to an example embodiment.

As shown in FIG. 7, the cooling flow channel 53 (whether formed in the second peripheral surface 54 or in the first interior wall 24) forms a loop around the piston cover 48. The second coolant flow passage 138 intersects with the cooling flow channel 53 such that the flow of hydraulic fluid is divided around the piston cover 48. That is, half of the flow from the second coolant flow passage 138 will flow clockwise through the cooling flow channel 53, and the other half will flow counterclockwise through the cooling flow channel 53. In the embodiment shown in FIG. 7, the hydraulic fluid flowing into the cooling flow channel 53 meets at a diametrically opposed point on the opposite side of the piston cover 48 to flow into a third coolant flow passage 142. In one or more other embodiments, the flow of hydraulic fluid may meet at a location that is not diametrically opposed to the entry point. In contrast to the first coolant flow passage 138 shown in FIG. 5, the second coolant flow passage 138 and the third coolant flow passage 142 of FIG. 7 are machined into different parts. In particular, the second coolant flow passage 138 is machined into the housing 12, whereas the third coolant flow passage 142 is machined into the piston cover 48. Thus, there is greater flexibility in the arrangement of the third coolant flow passage 142 relative to the second coolant flow passage 138 without increasing the difficulty of machining. However, in a preferred embodiment, the entry point of the hydraulic fluid from the second coolant flow passage 138 into the cooling flow channel 53 is diametrically opposed to the entry point of the hydraulic fluid flowing from the cooling flow channel 53 into the third coolant flow passage 142.

As can be seen in FIG. 7, the third coolant flow passage 142 extends inwardly in the piston cover 48 to a third cooled seal arrangement provided by the first seal channel 70 formed in the first interior aperture surface 68. The first seal channel 70 forms a loop around the piston shaft 58. The third coolant flow passage 142 intersects with the first seal channel 70 such that the flow of hydraulic fluid is divided around the piston shaft 58. That is, half of the flow from the third coolant flow passage 142 will flow clockwise through the first seal channel 70, and the other half will flow counterclockwise through the first seal channel 70. In the embodiment shown in FIG. 7, the hydraulic fluid flowing into the first seal channel 70 meets at a diametrically opposed point on the opposite side of the piston shaft 58 to flow into a perpendicular coolant flow passage 144. In one or more other embodiments, the flow of hydraulic fluid may meet at a location that is not diametrically opposed to the entry point.

Returning to FIG. 6, it can be seen that the vertical coolant flow passage 144 extends through the third surface 50 of the piston cover 48 and is in fluid communication with the interior cavity 28 of the housing 12. In this way, hydraulic fluid passing through the cooling flow path joins with hydraulic fluid in the interior cavity 28 of the housing 12 to flow through of the second passage 130 formed in the first interior wall 24 of the housing 12. In this way, constant cooling flow that directly contacts seals in the linear actuator 10 is provided.

In FIG. 6, the first seal channel 70 has a width W that is wider than the first seal 72. In this way, hydraulic fluid is constantly flowing by the first seal 72 to cool the first seal 72. In one or more embodiments, the first seal channel 70 includes a third step 146. The third step 146 has a shallower depth than the rest of the first seal channel 70. In particular, the third step 146 creates a region of the first seal channel 70 that matches the width of the first seal 72. In this way, movement of the first seal 72 within the first seal channel 70 is prevented, and the flow of hydraulic fluid into the first seal channel 70 is provided in the region of the first seal channel 70 having the shallower depth.

Conventionally, cooling flow in a linear actuator was provided by creating a flow path through the piston head. In this way, hydraulic fluid entering the first fluid chamber flowed through the piston head into the interior cavity and out through the second passage. As mentioned above, this type of cooling flow sought to cool the structural components, such as the piston head, piston shaft, piston cover, and housing, which indirectly cooled the seals. However, the inventor has found that the present cooling flow seal arrangements in which the seals are directly cooled with cooling flow reduce the maximum temperature of the seals by 23% during a fifteen minute fireproof test compared to the conventional cooling flow arrangement. Further, the inventor has found that the wider seal channels to provide cooling flow do not produce a detrimental effect on seal performance because the seals provided in the wider seal channels are pressurized in one direction.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A seal arrangement in a hydraulic device, comprising:
   a first seal channel defining a first loop and having a first width;
   a first seal seated within the first seal channel and having a second width that is less than the first width;
   a first coolant flow passage having a first part intersecting with the first seal channel at a first point and a second part intersecting with the first seal channel at a second point;
   wherein the first part of the first coolant flow passage is configured to provide hydraulic fluid to the first seal channel such that, at the first point, a first portion of the hydraulic fluid flows in a first direction around the first loop and a second portion of the hydraulic fluid flows in a second direction around the first loop, the second direction being opposite to the first direction;
   wherein, at the second point, the first portion of hydraulic fluid and the second portion of hydraulic fluid are configured to flow into the second part of the first coolant flow passage; and
   wherein the first seal channel comprises a first region with a first depth and a step with a second depth that is less than the first depth, wherein the first seal is located in the first region, and wherein the step is positioned to cover from about 20% to about 100% of an opening of the first part of the first coolant flow passage to prevent movement of the first seal in the first seal channel from completely obstructing flow of hydraulic fluid into the first seal channel.

2. The seal arrangement of claim 1, wherein the first loop is circular and the first part and the second part are diametrically opposed around the first loop.

3. A seal arrangement in a hydraulic device, comprising:
   a first seal channel defining a first loop and having a first width;
   a first seal seated within the first seal channel and having a second width that is less than the first width;
   a first coolant flow passage having a first part intersecting with the first seal channel at a first point and a second part intersecting with the first seal channel at a second point;
   wherein the first part of the first coolant flow passage is configured to provide hydraulic fluid to the first seal channel such that, at the first point, a first portion of the hydraulic fluid flows in a first direction around the first loop and a second portion of the hydraulic fluid flows in a second direction around the first loop, the second direction being opposite to the first direction;
   wherein, at the second point, the first portion of hydraulic fluid and the second portion of hydraulic fluid are configured to flow into the second part of the first coolant flow passage;
   wherein the second part of the first coolant flow passage is in fluid communication with a cooling flow line configured to transport the hydraulic fluid to a second coolant flow passage;
   wherein the second coolant flow passage intersects with an outer seal channel at a third point, the outer seal channel defining a second loop and having an outer seal seated therein;
   wherein a third portion of the hydraulic fluid flows in a third direction around the second loop and a fourth portion of the hydraulic fluid flows in a fourth direction around the second loop, the fourth direction being opposite to the third direction; and wherein, at a fourth point, the third portion of hydraulic fluid and the fourth portion of hydraulic fluid are configured to flow into a third coolant flow passage extending inwardly to an inner seal channel in which an inner seal is seated.

4. The seal arrangement of claim 3, wherein the outer seal channel comprises a first region with a first depth and a step with a second depth that is less than the first depth, wherein the outer seal is located in the first region, and wherein the step is positioned to cover from about 20% to about 100% of an opening of the second coolant flow passage.

5. The seal arrangement of claim 3, wherein the inner seal channel defines a third loop;

wherein a fifth portion of the hydraulic fluid flows in a fifth direction around the third loop and a sixth portion of the hydraulic fluid flows in a sixth direction around the third loop, the sixth direction being opposite to the fifth direction; and wherein, at a fifth point, the fifth portion of hydraulic fluid and the sixth portion of hydraulic fluid are configured to flow into an outlet passage arranged perpendicular to the third coolant flow passage.

6. The seal arrangement of claim 5, wherein the inner seal channel comprises a first region with a first depth and a step with a second depth less than the first depth and wherein the inner seal fills a width of the first region.

7. A linear actuator, comprising:

a housing having an interior cavity with a first end and a second end;

a piston head disposed within the interior cavity and movable from the first end toward the second end and back within the interior cavity, the piston head comprising a first surface and a second surface, the piston head dividing the interior cavity into a first interior cavity defined between the first end and the first surface and a second interior cavity defined between the second end and the second surface;

a piston cover disposed at the second end of the interior cavity, having a first surface, a second surface, an outer peripheral surface, and a first aperture extending from the first surface to the second surface, the first aperture having an interior aperture surface;

a piston actuator comprising a piston shaft and a position sensor disposed within the piston shaft, the piston shaft operatively connected to the piston head and extending through the first aperture of the piston cover and the position sensor including a head disposed within a second aperture of the housing;

a first port through which hydraulic fluid is configured to flow into the first interior cavity;

a second port through which hydraulic fluid is configured to flow into the second interior cavity; and at least one seal arrangement comprising at least one seal channel and at least one seal seated in the at least one seal channel;

wherein hydraulic fluid flowing between the first port and the second port is provided to the at least one seal channel to cool the at least one seal;

wherein the at least one seal arrangement is provided between at least one of the housing and the outer peripheral surface of the piston cover, the interior aperture surface and the piston shaft, or the head of the position sensor and the second aperture;

wherein the at least one seal arrangement comprises a first seal arrangement between the head of the position sensor and the second aperture, the first seal arrangement comprising a first seal channel forming a first loop around the head of the position sensor and a first seal seated within the first seal channel, and wherein the linear actuator further comprises:

a first coolant flow passage having a first part in fluid communication with the first port and intersecting with the first seal channel at a first point and a second part intersecting with the first seal channel at a second point;

wherein the first part of the first coolant flow passage is configured to provide hydraulic fluid to the first seal channel such that, at the first point, a first portion of the hydraulic fluid flows in a first direction around the first loop and a second portion of the hydraulic fluid flows in a second direction around the first loop, the second direction being opposite to the first direction; and wherein, at the second point, the first portion of hydraulic fluid and the second portion of hydraulic fluid are configured to flow into the second part of the first coolant flow passage.

8. The linear actuator of claim 7, wherein the first seal channel comprises a first region with a first depth and a step with a second depth that is less than the first depth, wherein the first seal is located in the first region, and wherein the step is positioned to cover from about 20% to about 100% of an opening of the first part of the first coolant flow passage.

9. The linear of claim 7, wherein the first loop is circular and the first part and the second part are diametrically opposed around the first loop.

10. The seal arrangement of claim 7, wherein the at least one seal arrangement further comprises a second seal arrangement between the housing and the outer peripheral surface of the piston cover and wherein the second part of the first coolant flow passage is in fluid communication with a cooling flow line configured to transport the hydraulic fluid to the second seal arrangement;

wherein the second seal arrangement comprises a second coolant flow passage, an outer seal channel forming a second loop around the piston cover, and an outer seal seated within the outer seal channel;

wherein the second coolant flow passage intersects with the outer seal channel at a third point;

wherein a third portion of the hydraulic fluid flows in a third direction around the second loop and a fourth portion of the hydraulic fluid flows in a fourth direction around the second loop, the fourth direction being opposite to the third direction.

11. The linear actuator of claim 10, wherein the outer seal channel comprises a second region with a third depth and a second step with a fourth depth that is less than the third depth, wherein the outer seal is located in the second region, and wherein the second step is positioned to cover from about 20% to about 100% of an opening of the second coolant flow passage.

12. The linear actuator of claim 10, wherein the at least one seal arrangement further comprises a third seal arrangement between the interior aperture surface and the piston shaft;

wherein, at a fourth point, the third portion of hydraulic fluid and the fourth portion of hydraulic fluid are configured to flow to the third seal arrangement, wherein the third seal arrangement comprises a third coolant flow passage, an inner seal channel defined in the interior aperture surface and forming a third loop around the piston shaft, and an inner seal seated within the inner seal channel, and wherein the third coolant flow passage extends inwardly to an inner seal channel.

13. The linear actuator of claim 12, wherein a fifth portion of the hydraulic fluid flows in a fifth direction around the third loop and a sixth portion of the hydraulic fluid flows in a sixth direction around the third loop, the sixth direction being opposite to the fifth direction; and wherein, at a fifth point, the fifth portion of hydraulic fluid and the sixth portion of hydraulic fluid are configured to flow into an outlet passage arranged perpendicular to the third coolant flow passage, the outlet passage in fluid communication with the second port.

14. The linear actuator of claim 13, wherein the inner seal channel comprises a third region with a fifth depth and a third step with a sixth depth less than the fifth depth and wherein the inner seal fills a width of the third region.

15. The linear actuator of claim 7, wherein the hydraulic fluid is fuel.

16. The linear actuator of claim 7, wherein the at least one seal of the at least one seal arrangement is kept below a temperature of 1000° F. for at least 5 minutes when tested according to SAE AS4273 or RTCA DO-160—Section 26.0.

17. The linear actuator of claim 16, wherein the at least one seal of the at least one seal arrangement is kept below a temperature of 1000° F. for at least 15 minutes when tested according to SAE AS4273 or RTCA DO-160—Section 26.0.

18. The linear actuator of claim 17, wherein the at least one seal comprises an elastomer or PTFE.

* * * * *